(12) United States Patent
Klarqvist et al.

(10) Patent No.: US 8,179,639 B2
(45) Date of Patent: May 15, 2012

(54) HEAD GIMBAL ASSEMBLY WITHOUT BUS TRACES FOR PLATING

(75) Inventors: Jon Klarqvist, Roseville, MN (US); Keefe Russell, Robbinsdale, MN (US)

(73) Assignee: Seagate Technology LLC, Cupertino, CA (US)

( * ) Notice: Subject to any disclaimer, the term of this patent is extended or adjusted under 35 U.S.C. 154(b) by 482 days.

(21) Appl. No.: 12/395,933

(22) Filed: Mar. 2, 2009

(65) Prior Publication Data

US 2010/0220414 A1 Sep. 2, 2010

(51) Int. Cl.
*G11B 5/48* (2006.01)

(52) U.S. Cl. ............... 360/245.9; 360/245.2; 360/245.3

(58) Field of Classification Search .............. 360/244.3, 360/245, 245.2, 245.8, 246.4
See application file for complete search history.

(56) References Cited

U.S. PATENT DOCUMENTS

| | | | |
|---|---|---|---|
| 5,401,913 A | 3/1995 | Gerber et al. | 174/264 |
| 5,883,759 A | 3/1999 | Schulz | 360/104 |
| 6,025,988 A | 2/2000 | Yan | 361/685 |
| 6,534,723 B1 | 3/2003 | Asai et al. | 174/255 |
| 7,059,868 B1 | 6/2006 | Yan | 439/67 |
| 7,203,033 B2 * | 4/2007 | Boutaghou | 360/245.8 |
| 7,372,669 B2 | 5/2008 | Deguchi et al. | 360/245.9 |
| 7,595,963 B1 * | 9/2009 | Chen et al. | 360/245.9 |
| 7,924,532 B2 * | 4/2011 | Jeong et al. | 360/245.8 |

* cited by examiner

*Primary Examiner* — Tan T. Nguyen
(74) *Attorney, Agent, or Firm* — Christopher L. Holt; Westman, Champlin & Kelly, P.A.

(57) ABSTRACT

Head gimbal assemblies for data storage systems are provided. Some embodiments include a dielectric layer having a first and a second side. A first conductive layer is on the first dielectric layer. The first conductive layer includes a pad and a trace. A second conductive layer is on the second dielectric side. A via extends from the first dielectric layer side to the second dielectric layer side. The via electrically connects the first conductive layer to the second conductive layer.

16 Claims, 7 Drawing Sheets

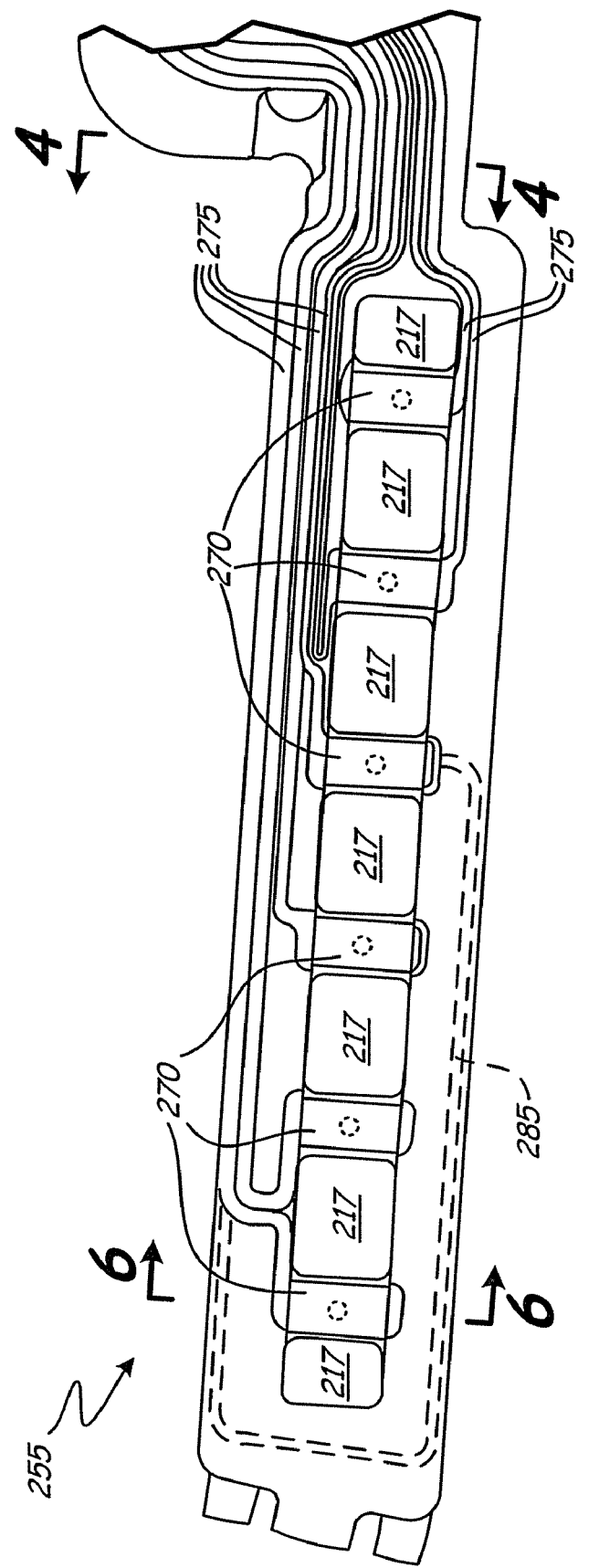

HEAD GIMBAL ASSEMBLY WITHOUT BUS TRACES FOR PLATING

BACKGROUND

One type of data storage system is a hard disc drive. A typical hard disc drive includes one or more magnetic discs that are rotated by a spindle motor at a substantially constant high speed and accessed by an array of read/write heads that store data on tracks defined on the disc surfaces. Each head is carried by a slider which is designed to "fly" just over the surface of the rotating disc. Each slider is attached to a head gimbal assembly. Each head gimbal assembly includes a suspension and a head gimbal assembly circuit that carries electrical signals between the read/write head and hard disc drive electronics.

Head gimbal assemblies can be manufactured in part by using an electroplating process. Electroplate processing requires that an electrical power or current source be connected to the head gimbal assemblies. The head gimbal assemblies typically will include bus traces to accomplish this electrical connection. Bus traces extend outside of the head gimbal assembly circuitry area to a point where they can be connected to a power source for electroplating. After electroplating, the bus traces are usually sheared, leaving a number of bus traces on the head gimbal assemblies with no further use. These bus traces and their associated processing have certain disadvantages such as causing distortion in electrical signals sent to and received from the read/write heads. Bus traces also require that an additional amount of area be added to HGA circuits. This may increase manufacturing costs and limit how close multiple head gimbal assemblies can be stacked together.

SUMMARY

Head gimbal assemblies for data storage systems are provided. Head gimbal assemblies illustratively include a dielectric layer having a first and a second side. Some embodiments include a first conductive layer on the first dielectric layer. The first conductive layer illustratively includes a pad and a trace. Some embodiments include a second conductive layer on the second dielectric side. Some embodiments include a via that extends from the first dielectric layer side to the second dielectric layer side. The via illustratively electrically connects the first conductive layer to the second conductive layer.

BRIEF DESCRIPTION OF DRAWINGS

FIG. 2 is top view of a tail section of a HGA circuit.
FIG. 5-1 is a cross-section of a HGA circuit.
FIG. 5-2 is a cross-section of another embodiment of a HGA circuit.

DETAILED DESCRIPTION

Figure 1:
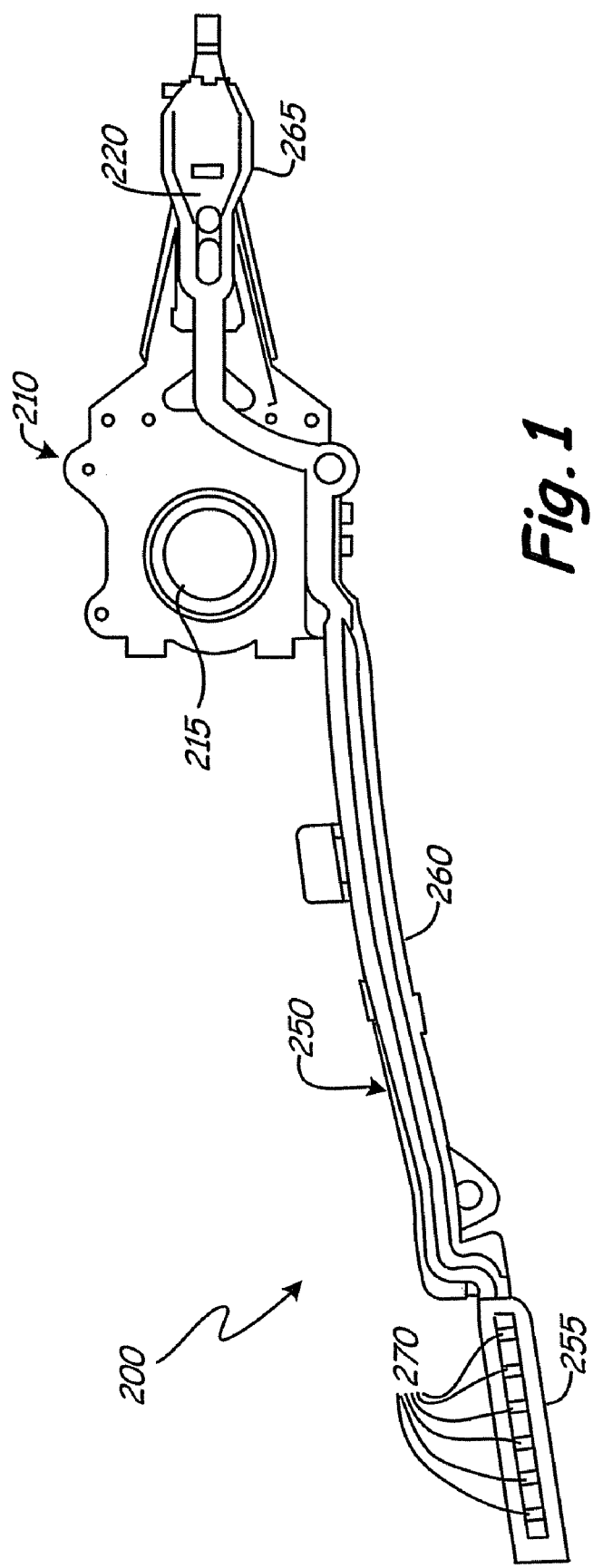
FIG. 1 is a top view of a head gimbal assembly (HGA).

FIG. 1 is a top view of an embodiment of a head gimbal assembly (HGA) 200. HGA 200 may be incorporated into a disc drive. Each HGA 200 includes a suspension 210 and a HGA circuit 250. Each HGA circuit provides an electrical pathway that facilitates communication between a slider read/write head and associated hard disc drive system electrical components including preamplifiers, controllers, flexures, printed circuit boards, or other components. Each suspension mechanically supports a HGA circuit and a slider, and transfers motion from an actuator arm to a slider.

In an embodiment, suspension 210 and HGA circuit 250 are two separate pieces. In another embodiment, suspension 210 and HGA circuit 250 are formed as one piece. Suspension 210 includes features such as aperture 215 that facilitate connecting HGA 200 to an actuator arm. Suspension 210 also includes features in its head gimbal region 220 that facilitate connecting a slider and an HGA circuit such as HGA circuit 250 to the suspension. HGA circuit 250 includes a tail section 255, a body section 260, and a head gimbal section 265.

Figures 1, 5:
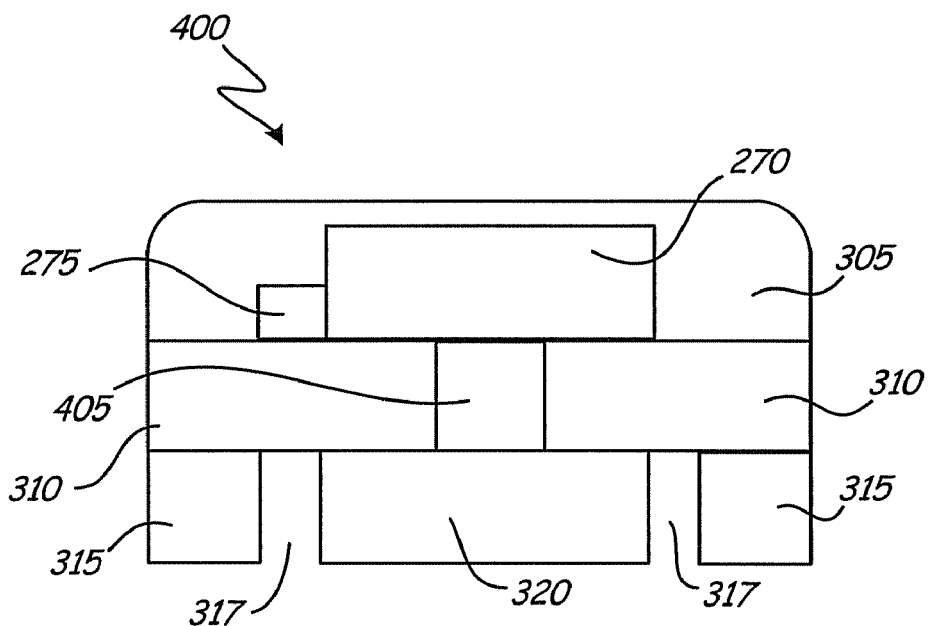
Figures 2, 5:
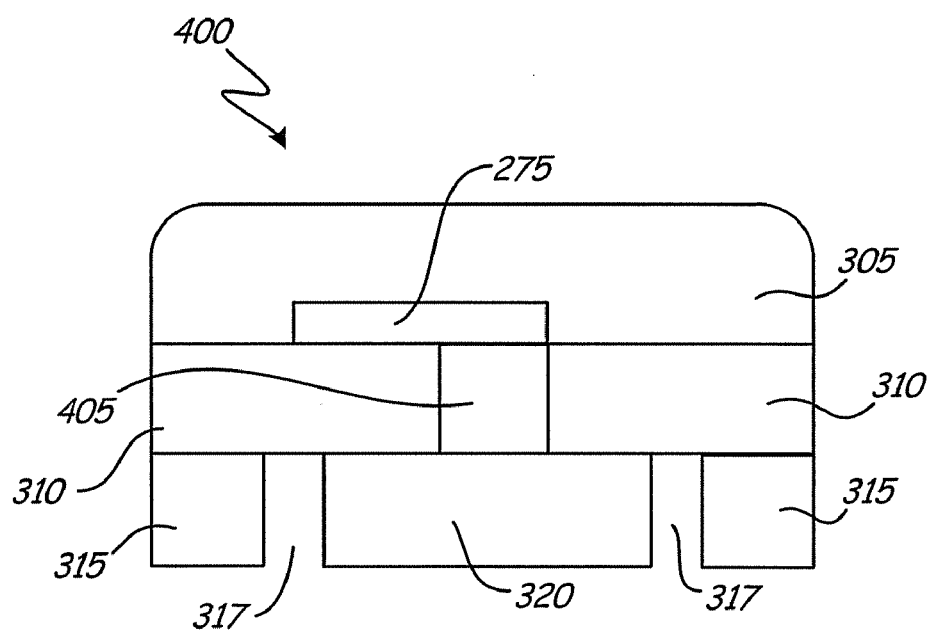

FIG. 2 is top view of tail section 255 of HGA circuit 250. Tail section 255 includes six pads 270 and six traces 275. As will be discussed in further detail below, embodiments of pads 270 and traces 275 are made from an electrically conductive material such as copper, and are formed such that one pad and one trace are electrically connected to each other and are electrically isolated from the other pads and traces. Traces 275 continue from tail section 255 and extend across HGA circuit body section 260 (shown in FIG. 1) until they reach HGA circuit head gimbal section 265 (also shown in FIG. 1). At head gimbal section 265, traces 275 connect to and terminate at read/write head connection points. In an embodiment, pads 270 are electrically connected to a hard disc drive system electrical component such as a preamplifier, and read/write head connection points are electrically connected to a read/write head. In the embodiment shown in the figure, tail section 255 includes substrate openings 217. Substrate openings 217 could be eliminated as design considerations warrant. In an embodiment, HGA circuit 250 facilitates communication from the slider read/write head to the hard disc drive components such that data can be read from and written to a recording medium.

The additional flexibility gained by using embodiments should also be noted. By removing the bus traces discussed earlier, restriction on trace routing options can be minimized. For example, in FIG. 2, the trace 275 that is currently going to the last pad 270 (i.e. the pad closest to the left, or in other words, the pad furthest from the head gimbal section) could easily be rerouted to go to a different pad, like the third pad (i.e. the pad third from the right, or third nearest the head gimbal section). This can be accomplished for example by routing the trace behind the last pad and along the section opposite from the pads where the traces 275 are routed in FIG. 2. An illustrative embodiment of such an alternative routing is indicated by alternative trace path 285.

Figure 3:
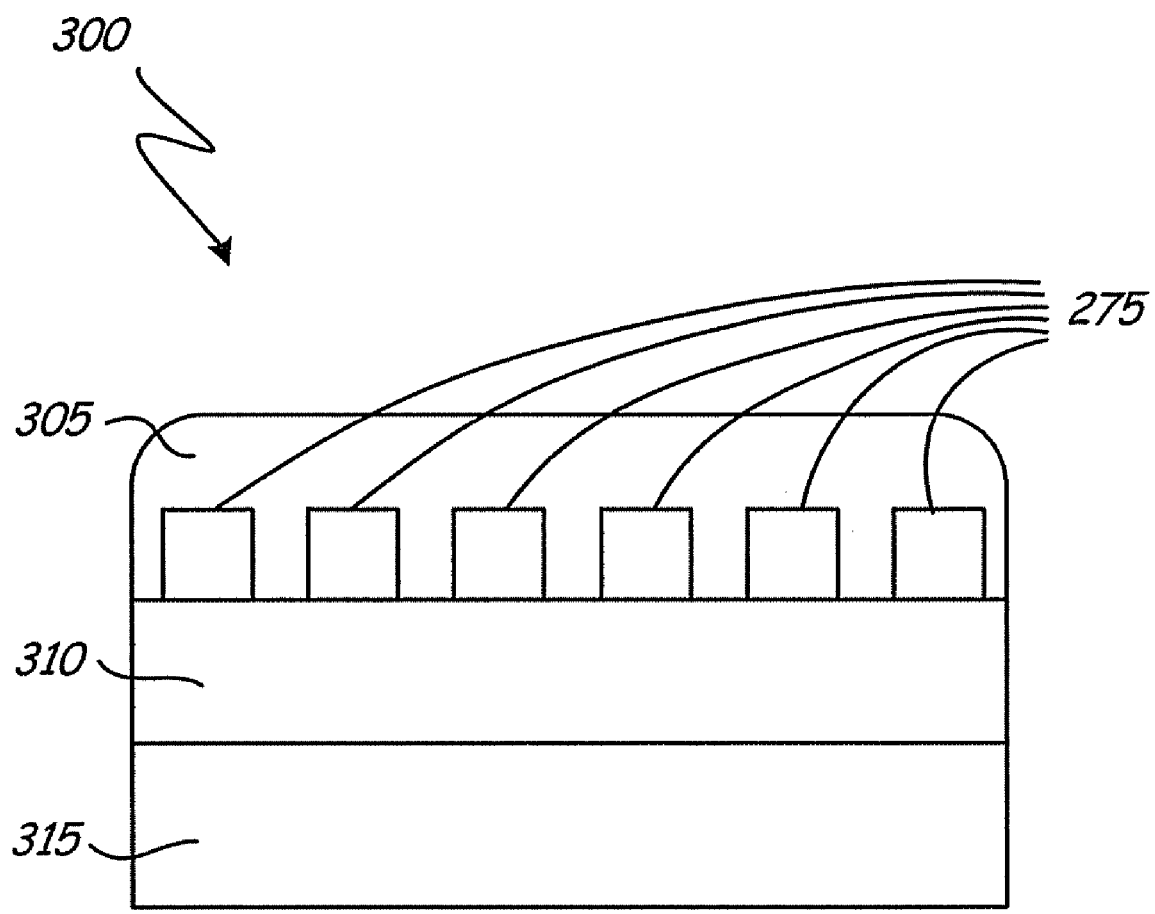
FIG. 3 is a cross-section of a HGA circuit.

FIG. 3 is an illustrative cross-section 300 of HGA circuit 250 at line 4-4 in FIG. 2. Cross-section 300 includes traces 275. As was previously mentioned, in an embodiment, traces 275 are made from an electrically conductive material such as copper. Traces 275 can be made from any conductive material. In one embodiment, traces are made from copper surrounded or encased by gold or by a gold/nickel alloy to reduce the possibility of exposed copper corroding. Cross-section 300 also includes a coverlay layer 305. In an embodiment, coverlay 305 covers or at least partially covers traces 275. Embodiments of coverlay 305 are made from a dielectric material such as polyimide that electrically isolates traces 275. Coverlay 305 also illustratively reduces the exposure of traces to harmful environmental conditions such as humidity and oxygen that could cause the traces to corrode. Cross-section 300 also includes dielectric layer 310. Dielectric layer 310 is illustratively made from any electrically isolating material, in some embodiments polyimide. Dielectric layer 310 provides physical support for traces 275. Dielectric layer 310 also electrically isolates traces 275, pads 270 (shown in FIG. 2), and HGA circuit read/write head connections. Finally, cross-section 300 includes substrate 315. In an embodiment, substrate 315 provides physical support for the HGA circuit's electrically conductive and isolative layers, and provides features that are used in connecting the HGA circuit to a suspension such as suspension 210 (shown in FIG. 1). Substrate 315 is made from any conductive material such as a metal (e.g. stainless steel). Substrate 315 can also be illustratively made from non-conductive materials.

Figure 4:
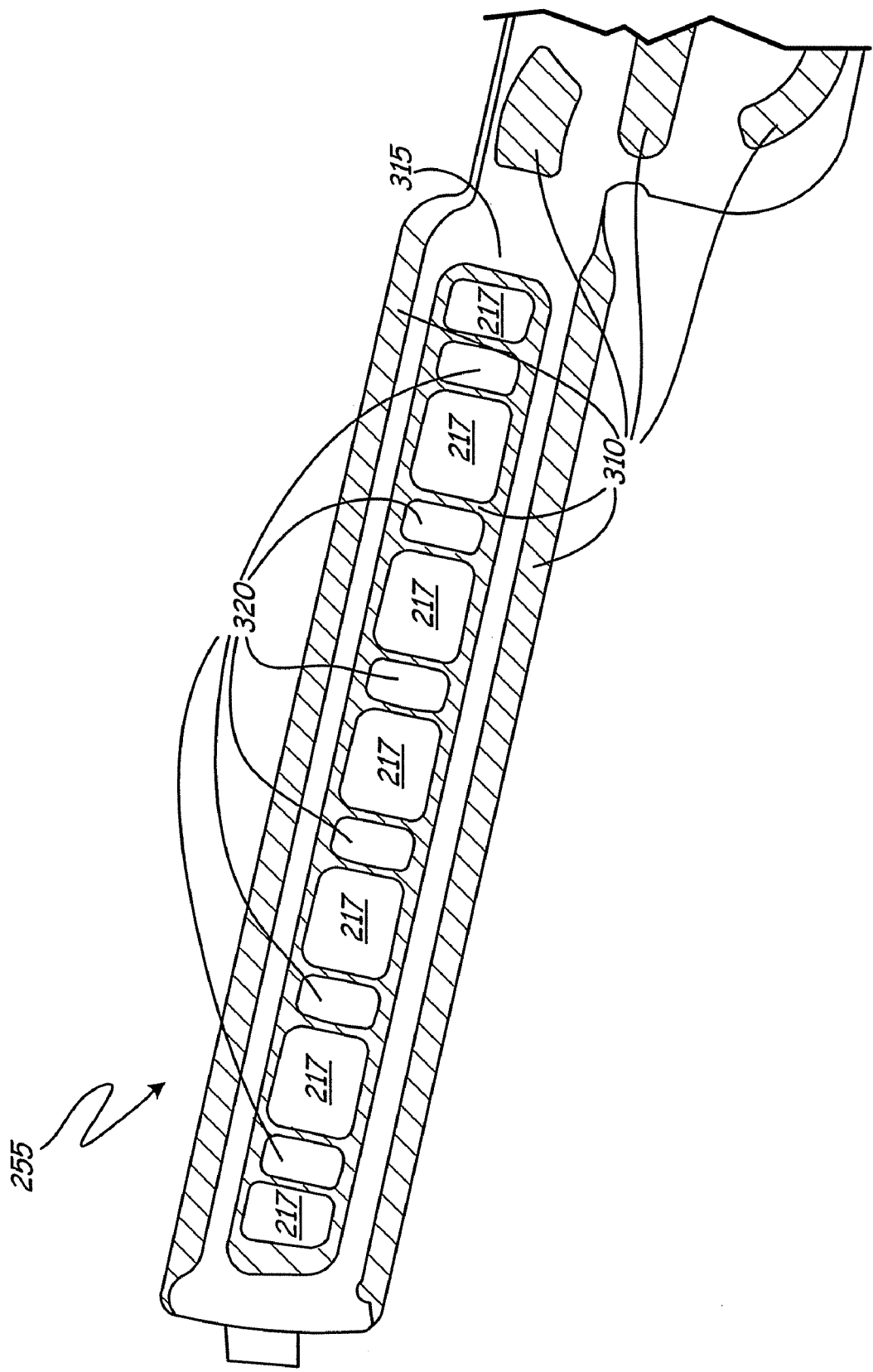
FIG. 4 is a bottom view of a tail section of a HGA circuit.

FIG. 4 is a bottom view of tail section 255 of HGA circuit 250. FIG. 4 shows the same region of HGA circuit 250 as FIG. 2 including optional substrate openings 217, but FIG. 4 shows the device lying on its opposite side (i.e. the side facing up in FIG. 2 is facing down in FIG. 4). FIG. 4 includes substrate 315 and dielectric layer 310 (shown and previously discussed in describing FIG. 3). FIG. 4 also includes islands 320. Embodiments of HGA circuit 250 also include vias as well as islands. As will be discussed later, islands and vias provide many advantages in device performance and manufacturing. In an embodiment, islands 320 are made from an electrically conductive material. In another embodiment, islands 320 and substrate 315 are made from the same material. In an embodiment, each island 320 is electrically isolated from one another and from substrate 315. In yet another embodiment, each island 320 corresponds to one pad 270 (shown in FIG. 2).

FIG. 5-1 is an illustrative cross-section 400 of HGA circuit 250 at line 6-6 in FIG. 2. Cross-section 400 includes many of the features previously discussed such as coverlay 305, pad 270, traces 275, dielectric layer 310, substrate 315, and island 320. The configuration of trace 275 shown in FIG. 5-1 is one embodiment. Other embodiments include different locations and sizes for trace 275 connecting to pad 270. FIG. 5-1 also includes via 405. In an embodiment, via 405 is made from any electrically conductive material such as copper or stainless steel, and electrically connects island 320 and pad 270. In an embodiment, each island 320 (shown in FIG. 4) is connected to a corresponding pad 270 (shown in FIG. 2) by a via 405. As was previously discussed, pad 270 is electrically connected throughout the HGA circuit 250 by a corresponding trace 270. Thus, island 320 is electrically connected throughout the HGA circuit 250 because it is electrically connected to pad 270. In certain embodiments, island 320 is electrically isolated from substrate 315 by isolation zone 317. Isolation zone 317 can be an area devoid of material in some embodiments. In other embodiments, isolation zone 317 can comprise an electrically insulating material like dielectric.

It is worth noting at this time that embodiments of islands 320 and vias 405 do not necessarily connect to pads 270. FIG. 5-2 is a cross-section of another embodiment of a HGA circuit. FIG. 5-2 shows the same or similar features as FIG. 5-1 and is numbered accordingly. In the embodiment shown in the figure, island 320 and via 405 are not electrically connected to trace 275 through a pad such as pad 270 shown in FIG. 5-1. Instead, island 320 and via 405 are directly connected to trace 275.

Figure 6:
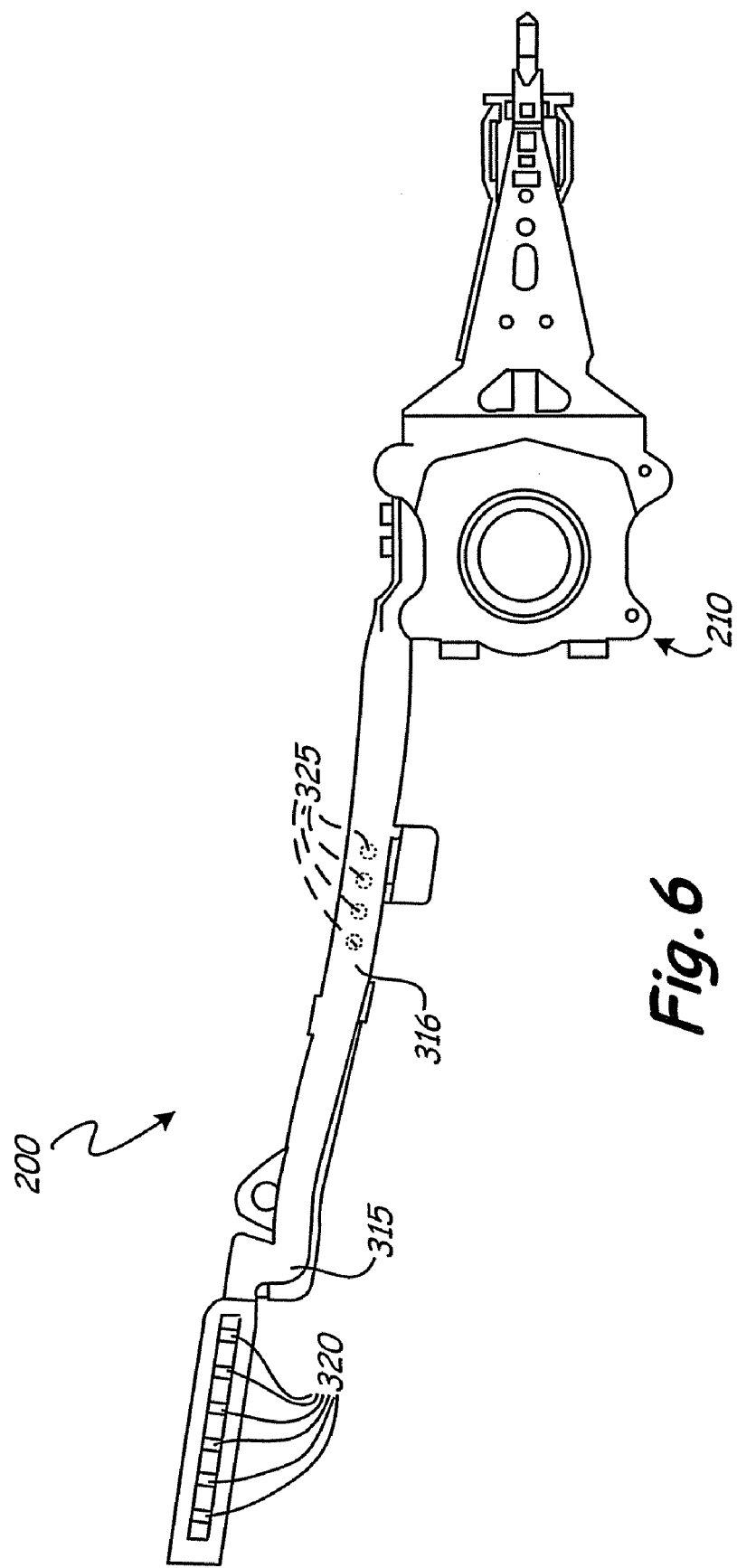
FIG. 6 is a bottom view of a head gimbal assembly.

FIG. 6 is a bottom view of an embodiment of a head gimbal assembly 200. FIG. 6 shows the same HGA 200 as FIG. 1, but FIG. 6 shows the device lying on its opposite side (i.e. the side facing up in FIG. 1 is facing down in FIG. 6). FIG. 6 includes HGA circuit islands 320, HGA circuit substrate 315, and suspension 210. Islands 320 and vias 405 may be positioned anywhere so long as they form an electrical connection to the pad and trace circuitry. Since the circuitry passes throughout the HGA circuit, this means that the islands and vias can be located almost anywhere on the HGA circuit. For example, FIG. 6 shows a large region 316 that is currently occupied by substrate 315. In embodiments, this area or portions of this area include islands and vias 325. Islands and vias 325 are shown as circular in this alternate location embodiment. Embodiments of islands and vias are not however limited to any shape, size, or material. In FIG. 6, the HGA circuit head gimbal section 265 (shown in FIG. 1) is largely obstructed by suspension 210. In embodiments, that area, section 265, includes islands and vias.

As will be discussed later in further detail, HGA circuit manufacturing frequently involves electroplating. Most often, pads such as pads 270 and traces such as traces 275 are first formed out of copper or an alloy primarily consisting of copper. These largely copper pads and traces are then electroplated to form a gold, gold/nickel, or similar layer on top of the copper. These plated layers prevent copper corrosion and can improve electrical performance. One requirement of electroplating processes is that an electrical current needs to be ran through the metal being plated.

Embodiments of HGA circuits with vias and islands such as HGA circuit 250 do not need bus traces for electroplate processing. These HGA circuits provide higher performance by reducing the distortion in the high-speed electrical signals sent between the preamplifier and the read/write head caused by the bus traces. These HGA circuits also do not require the extra space on the device to include the bus traces. This enables these devices to be stacked more closely together to enable higher head and disc counts in disc drives.

Figure 7:
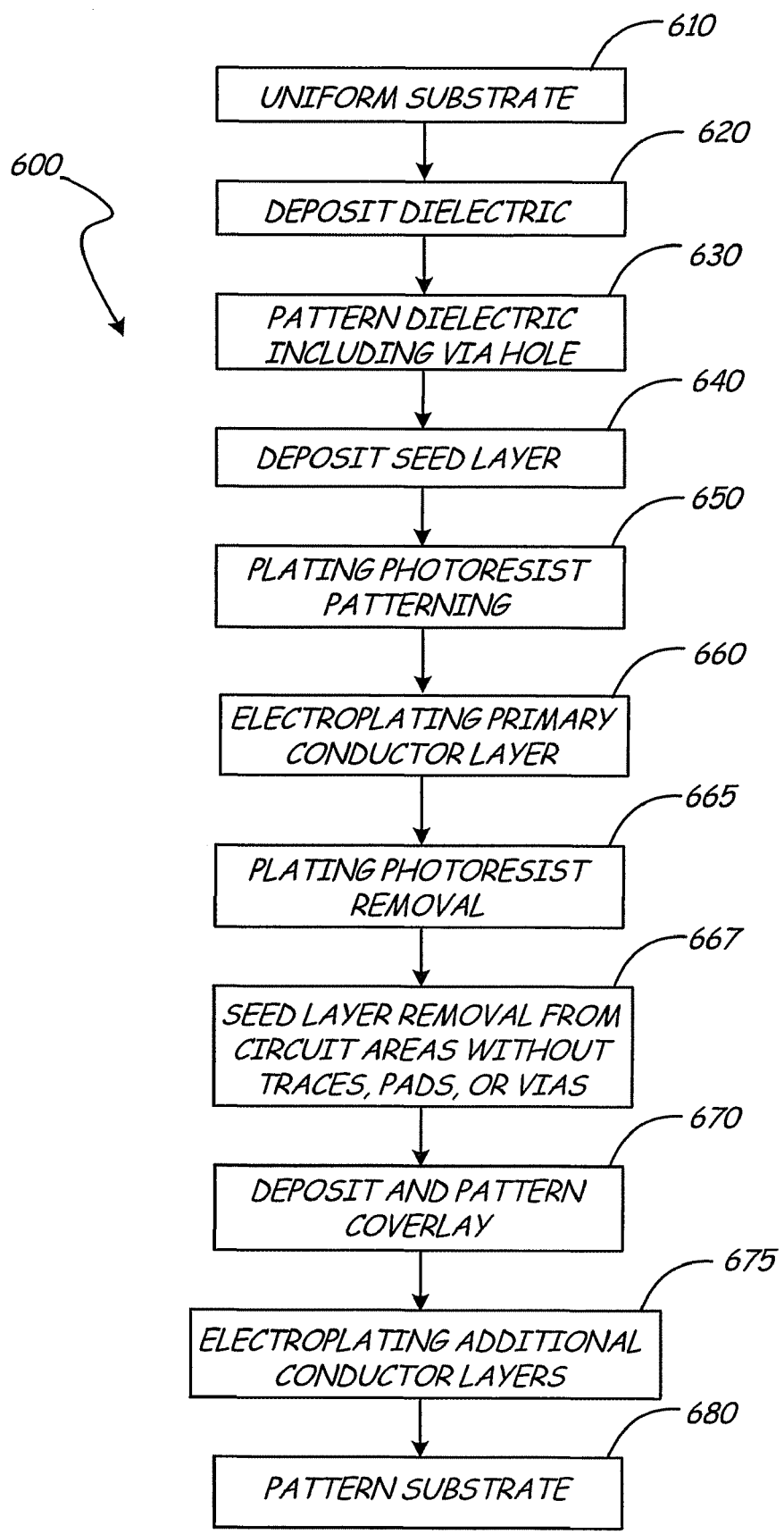
FIG. 7 is a process flow for manufacturing a HGA circuit.

FIG. 7 is an illustrative process flow 600 for manufacturing a HGA circuit with vias and islands such as HGA circuit 250. Embodiments of HGA circuit 250 are not limited to any particular process flow. Other embodiments of process flows for manufacturing HGA circuits with vias and islands also exist, and some illustrative examples of those will be described following the description of FIG. 7. It should be noted that none of these process flows require bus traces for plating. Process 600 begins at step 610. At step 610, a uniform piece of material that will be used as a substrate is obtained. An illustrative substrate is a flat and relatively thin piece of metal such as stainless steel. The material is uniform in that it has approximately the same thickness throughout its length and width. The length and width of the substrate needs to be at least large enough to contain one HGA circuit. In embodiments, substrates are large enough that multiple HGA circuits are made from one substrate. An example of at least a portion of a substrate in a finished device is substrate 315 (shown in FIG. 3).

At step 620, a uniform layer of dielectric material such as polyimide is deposited on the substrate. Process flow 600 and step 620 are not limited to any one method of depositing the dielectric material. Illustrative methods include laminating a film of dielectric to the substrate, pouring a liquid mixture of dielectric material on the substrate surface and then drying it, and using chemical vapor deposition techniques. An example of at least a portion of a layer of dielectric material in a finished device is dielectric 310 (shown in FIG. 3).

At step 630, the dielectric material deposited at step 620 is patterned so that the only material that will be left is the material that will form the dielectric layer in the finished devices such as dielectric layer 310 (shown in FIGS. 4, 5-1, and 5-2). It should be noted that this step includes patterning a hole where a via such as via 405 (shown in FIGS. 5-1 and 5-2) will be formed. Although process 600 is not limited to any single patterning method, one example of a patterning method is to use a photolithographic process to form photoresist over the areas of the dielectric layer where dielectric is to remain, then to remove the exposed/unwanted dielectric with reactive ion etching, ion milling, or a wet etch, and then to remove the photoresist with a wet stripping process or an oxygen ashing process. An example of at least a portion of a patterned dielectric layer in a finished device is dielectric 310 (shown in FIGS. 5-1 and 5-2 to have been patterned for a hole for via 405).

At step 640, a seed layer is deposited on the substrate and the patterned dielectric layer. The seed layer facilitates electroplating at step 660 by allowing material to be plated where the seed layer is deposited.

At step 650, photoresist is deposited on top of the seed layer. It is patterned such that photoresist blocks the areas that will not be covered by the plating material, and that the areas to be plated are free from photoresist. The areas that will be plated include the areas where the vias will be formed, where the traces will be formed, and where the pads will be formed.

At step 660, plating of the primary conductor layer is performed. It is worth noting that at this point in the process flow that the substrate material is still uniform (i.e. it has not been patterned). In an embodiment, at step 660, a power source (i.e. source of electrical current) is connected to, and only to, the substrate. In another embodiment, a power source is connected to the substrate and one or more of another layer such as the dielectric layer, seed layer, or photoresist. After the power source is connected, the substrate and attached layers are put into a plating bath. In an embodiment, copper is plated to form the vias, the pads, and the traces. Process 600 is not limited to any specific type of plating machinery, process, or plating materials (e.g. copper, gold, nickel, etc.). Examples of at least a portion of plating in a finished device are via 405, pad 270 (both shown in FIGS. 5-1 and 5-2), and traces 275 (shown in FIG. 3).

At step 665, the photoresist used to define the primary conductor layer is removed. Step 665 is not limited to any particular methods, materials, or processes. Illustrative photoresist removal steps include removing the photoresist with a wet stripping process, removing the photoresist with an oxygen ashing process, or removing the photoresist with a physical etch such as ion milling.

At step 667, the seed layer that was deposited at step 640 is removed from the areas that were not plated with the primary conductor layer at step 660 (e.g. areas surrounding but not including the traces, pads, and vias).

At step 670, a protective coverlay layer is deposited on top of at least a portion of the plated traces. The coverlay may also optionally be deposited on top of dielectric deposited at step 620 or the substrate at step 610. In an embodiment, the coverlay is of the same or similar type of material as the dielectric layer, and it is also deposited and patterned in a similar manner. The coverlay is patterned to only cover the desired portions of the devices. In an embodiment, traces are covered, but the pads and connections to the read/write head are not. Embodiments of HGA circuits do not have coverlay and thus do not include this processing step (i.e. this step is optional). An example of at least a portion of a coverlay layer in a finished device is coverlay 305 (shown in FIGS. 3, 5-1, and 5-2).

At step 675, plating of additional conductor layers is performed. Plating of additional conductor layers is optional. Additional conductor layers that may be plated include, but are not limited to, gold, nickel, or a combination of gold/nickel. The additional layers are illustratively used to prevent corrosion or improve device performance. Step 675 is not limited to any particular methods, materials, or processes. Methods such as those described at step 660 are illustratively used.

It should also be noted that the plating of additional conductor layers such as at step 675, is not limited to any particular sequential order. For example, the plating of additional conductor layers can optionally be performed between steps 667 and steps 670 (i.e. plating the additional layers before depositing coverlay).

At step 680, the substrate is patterned. In embodiments, the same or similar methods used to pattern the dielectric layer are used to pattern the substrate (e.g. photolithography followed by wet etch). In an embodiment, the substrate is patterned such that the only or substantially only areas of substrate remaining are the parts of the substrate that will be part of the finished HGA circuit. In an embodiment, a substantial portion of substrate that will not be part of a HGA circuit may be left to hold HGA circuits together for further processing. In embodiments, islands such as islands 320 (shown in FIG. 4) are patterned. As has been previously described, islands are electrically connected to vias and then to the pads, traces, and remaining HGA circuit circuitry. In an embodiment, forming islands are important to electrically isolate the signals traveling through the traces. After the substrate is patterned, further optional processes may be done as needed or as desired. For example, if multiple HGA circuits are formed from one substrate, an optional mechanical separation process such as punching, stamping, or shearing may be needed to separate the devices into individual HGA circuits. Examples of at least a portion of patterned substrate in a finished device are island 320 and substrate 315 (both shown in FIGS. 5-1 and 5-2).

In process flow 600, the plating step 660 occurred before the substrate patterning step 680. In another illustrative embodiment of a process flow, the substrate patterning step occurs before the plating step. In an embodiment, the substrate is first patterned. This patterning includes forming islands. Then, a conductive film is placed across the patterned substrate including the islands. At the plating step, the power or current source is electrically connected to the conductive film. The substrate, its attached layers, and the conductive film are then placed in the plating bath or baths for plating. Following plating, the conductive film is removed. It is worth noting that in both this alternative process flow and flow 600, that the plating step is performed without the use of bus traces as previously described.

The above process flows describe a HGA circuit manufacturing process commonly referred to as an additive process. That means that the circuit elements are formed by adding material to a simple substrate such as a flat piece of stainless steel. Embodiments also include a subtractive process. In a subtractive process, the starting substrate is more complex such as a stack of stainless steel, polyimide, and copper (with the polyimide between the stainless steel and copper). In a subtractive process, at least a couple parts of the finished circuit are formed by the starting substrate.

In an embodiment, a substrate such as stainless steel, polyimide (or other dielectric), and copper is used. The stainless steel and dielectric layer are then patterned to form a via hole. A conductive material is then filled or deposited in the hole to form a via and to electrically connect the via to the stainless steel. Then, after any desired process such as copper patterning, the copper is plated with, gold, gold/nickel, etc. by connecting the stainless steel to the electroplating power source.

In another embodiment, starting again with the more complex starting material, the copper and dielectric layer are patterned to form a via hole. Then after any desired process such as copper and dielectric patterning, a seed layer and photoresist are added on top of the copper side. The copper layer is then gold or nickel/gold plated by connecting the stainless steel to the electroplating power source.

The HGA circuit manufacturing process flows described above are only illustrative embodiments. Embodiments are not limited to any particular process flow. Numerous variations and methods are possible, and all are included in embodiments. Similarly, changes and new developments in HGA circuit manufacturing process flows are also included in embodiments.

It should be noted that embodiments are not limited to any particular type of HGA circuit. Illustrative embodiment HGA circuit 250 includes six traces and six pads. Embodiments include any number of traces and pads, including more or less than the illustrated six. Embodiments also include any additional circuitry known in the art or will be developed in the art that is added to HGA circuits.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A head gimbal assembly for a data storage system comprising:
    a dielectric layer having a first and a second side;
    a first conductive layer on the first dielectric side, the first conductive layer having a pad and a trace;
    a second conductive layer on the second dielectric side, the second conductive layer comprising an island; and
    a via that is electrically connected to the island and extends from the first dielectric layer side to the second dielectric layer side, and wherein the via electrically connects the first conductive layer to the second conductive layer.

2. The head gimbal assembly of claim 1 wherein the via is electrically connected to the pad.

3. The head gimbal assembly of claim 1 wherein the via is electrically connected to the trace.

4. The head gimbal assembly of claim 1, wherein the second conductive layer further comprises a second island and wherein the first and second islands are electrically isolated from each other.

5. The head gimbal assembly of claim 1 wherein the first conductive layer comprises copper and the second conductive layer comprises stainless steel.

6. The head gimbal assembly of claim 1 wherein the first conductive layer further comprises a second pad and a second trace.

7. The head gimbal assembly of claim 1, further comprising a coverlay layer at least partially covering a portion of the trace, wherein the dielectric layer and the coverlay layer comprise polyimide.

8. A head gimbal assembly circuit for a data storage system comprising:
    an electrically conductive pad;
    an electrically conductive trace, wherein the trace is electrically connected to the pad;
    a dielectric layer;
    an electrically conductive island, wherein the island is separated from the pad and the trace by the dielectric layer; and
    an electrically conductive via, wherein the electrically conductive via passes through the dielectric layer and electrically connects the island to the pad and the trace.

9. The head gimbal assembly circuit of claim 8 and further comprising:
    a second electrically conductive pad;
    a second electrically conductive trace, wherein the second trace is electrically connected to the second pad;
    a second electrically conductive island, wherein the second island is separated from the second pad and the second trace by the dielectric layer; and
    a second electrically conductive via, wherein the second electrically conductive via passes through the dielectric layer and electrically connects the second island to the second pad and the second trace.

10. The head gimbal assembly circuit of claim 9 wherein the islands are electrically isolated from one another.

11. The head gimbal assembly circuit of claim 9 wherein the traces are electrically isolated from one another.

12. The head gimbal assembly circuit of claim 9 wherein the pads are electrically isolated from one another.

13. The head gimbal assembly circuit of claim 8 and further comprising a coverlay layer that covers at least a portion of the trace.

14. The head gimbal assembly circuit of claim 8 wherein the trace comprises copper.

15. The head gimbal assembly circuit of claim 14 wherein the trace further comprises gold.

16. A data storage system comprising:
    a read/write head;
    a system electrical component;
    a circuit connected to the read/write head and to the system electrical component, wherein the circuit transmits electrical signals between the read/write head and the system electrical component and wherein the circuit is at least partially electrically isolated by a dielectric layer;
    an aperture in the dielectric layer; a via, wherein the via is located at least partially within the aperture in the dielectric layer and wherein the via is electrically connected to at least a portion of the circuit;
    a second aperture in the dielectric layer; and
    a second via, wherein the second via is located at least partially within the second aperture in the dielectric layer, wherein the second via is electronically connected to at least a portion of the circuit, and wherein the vias are electrically isolated from each other.

* * * * *